United States Patent [19]

Kish

[11] Patent Number: 5,492,305
[45] Date of Patent: Feb. 20, 1996

[54] CONNECTOR ASSEMBLY FOR CONNECTING A SOURCE OF FLUID WITH A CONTAINER TO BE FILLED

[75] Inventor: Arthur S. Kish, Sarasota, Fla.

[73] Assignee: JEM Industries, Inc., Willoughby, Ohio

[21] Appl. No.: 372,058

[22] Filed: Jan. 12, 1995

[51] Int. Cl.⁶ ........................................ F16L 37/28
[52] U.S. Cl. ...................... 251/149.6; 251/149.1
[58] Field of Search ............... 251/149.1, 149.6, 251/149.7; 137/614.04, 614.05; 62/50.7

[56] References Cited

U.S. PATENT DOCUMENTS

| | | | |
|---|---|---|---|
| 1,816,567 | 7/1931 | Butler | 251/149.6 X |
| 2,692,151 | 10/1954 | Melato | 251/149.6 X |
| 3,646,964 | 3/1972 | Stratman | 137/614.05 X |
| 3,831,443 | 8/1974 | Planche | 137/614.05 X |
| 4,655,251 | 4/1987 | Nimberger | 251/149.6 X |

OTHER PUBLICATIONS

JEM Industries, Inc. Assembly No. 250005 as illustrated in Fig. 2 and described on incorporated pp. 2 through 4 of the application herein.

*Primary Examiner*—A. Michael Chambers
*Assistant Examiner*—Kevin L. Lee
*Attorney, Agent, or Firm*—Tarolli, Sundheim & Covell

[57] ABSTRACT

A connector assembly is disclosed for connecting a source of fluid, such as a refrigerant, with a container, such as in an air conditioning system. The assembly includes an elongated tubular body having a fluid passageway extending axially therethrough from an inlet to an outlet. A depressor is located in the passageway intermediate the inlet and outlet and is mounted for slidable movement between a normally valve closed first position and a valve open second position. A ball valve check assembly is located within the passageway in the tubular body between the inlet and the depressor. This assembly includes a spool having a spool passageway extending axially therethrough. The spool passageway has a first portion and a second portion with the second portion being located downstream from the first portion and being of a smaller diameter. A radially extending shoulder interconnects the first and second portions. A resilient ball having a diameter greater than the second passageway portion but less than the first passageway portion is located within the first portion. A spring normally resiliently biases the ball member against the shoulder to prevent passage of fluid through the spool passageway. The depressor has an actuator for engaging the ball member and displacing same against the resilient bias of the spring. This opens the ball valve assembly to permit fluid flow from the inlet to the outlet.

19 Claims, 3 Drawing Sheets

CONNECTOR ASSEMBLY FOR CONNECTING A SOURCE OF FLUID WITH A CONTAINER TO BE FILLED

BACKGROUND OF THE INVENTION

TECHNICAL FIELD

This invention relates to the art of fluid connectors and, more particularly, to an improved fluid connector for use in Connecting a source of fluid, such as a refrigerant, with a container, such as an accumulator or a condenser in an air conditioning system, to be filled with fluid.

BACKGROUND OF THE INVENTION

Fluid connectors for supplying fluid from a fluid source to a container to be filled with fluid are known in the art. Such connectors are frequently employed for use in dispensing refrigerant into an automotive air conditioning system from a source of refrigerant. The refrigerant may be of the Freon type. It is important that the connector employed for dispensing refrigerants into an air conditioning system does not leak. This is to prevent leakage into the atmosphere which may cause depletion to the earth's ozone layer.

FIG. 1 illustrates an application of the present invention wherein a connector assembly 10 is connected to a hose 12 which is connected to a source of refrigerant 14. The connector 10 functions as a female connector and is intended to be connected to a male inlet fitting 16 on an accumulator or condenser container 18 to be filled with refrigerant 14.

Referring now to FIG. 2, there is illustrated a prior art connector 10' which has been employed for connecting a source of refrigerant with a container to be filled with refrigerant, as in the application of FIG. 1. This prior art connector 10' may take the form of assembly 250005 provided by the assignee herein, JEM Industries, Inc. This connector assembly includes an elongated tubular body 20 constructed of metal, such as brass. The body 20 has a passageway 22 extending therethrough from an inlet 24 to an outlet 26. The passageway 22 is circular in cross section and has a first enlarged diameter portion 28 which receives a coiled spring 30. A depressor 32 is contained in the passageway between the inlet 24 and the outlet 26 and is provided with a plunger portion 34 that extends toward the inlet 24 for engaging the coiled spring 30. The depressor 32 is provided with a enlarged disk portion 40 which is located in an enlarged passageway portion 42 of the passageway 22. The depressor may be displaced in an axial direction from the position, as shown, in an upward direction against the resilient bias of spring 30 until the disk portion 40 of the depressor engages an annular shoulder 50 that separates the enlarged passageway portion 42 from passageway portion 28.

The tubular body 20 coaxially surrounds the passageway 22 and includes a first body portion 52 which surrounds a portion of the length of the first enlarged passageway 28 and then a second body portion 54 that surrounds the remaining portion of passageway portion 28. This is followed by an outwardly extending body portion 56 that surrounds the enlarged passageway portion 42. The enlarged passageway portion 42 is provided with an annular groove 60 and which receives a seal ring 62. The seal ring 62 is annular in shape and includes an annular rib 70 which extends in the direction of the inlet 24 and, in the valve closed position, bears against the flat sealing surface 72 of depressor disk portion 40. Spring 30 normally resiliently biases depressor plunger portion 34 and the depressor 32 toward the outlet 26 causing the sealing surface 72 of the depressor disk portion 40 to normally make sealing engagement with rib 70 of seal ring 62.

The inlet of the body 20 is provided with external threads 76 so that the body may be fastened to a suitable fitting located on one end of a hose, such as hose 12, and which is connected to the source of refrigerant 14 by way of a suitable shut-off valve 78. A cap 80 surrounds the enlarged body portion 56 of the body 20 and is held in place, as with a snap ring 82. The cap 80 extends beyond the outlet 26 of the body 20 and is provided with a bore 84 having internal threading 86. This threading permits the cap 80 to be mounted on a male inlet fitting 16, provided with external threading, so that the cap may be threaded on to the inlet fitting. As the cap is being threaded on to the inlet fitting an actuator associated with the inlet fitting may extend through bore 84 and, hence, through the seal ring 62 and engage the depressor 32. The depressor 32 is then displaced against the resilient force of spring 30 to break the seal between the seal surface 72 and rib 70 of seal ring 62, permitting fluid under pressure to flow from 10 the source 14 through the passageway 22 of body 20 and beyond the depressor 32 into the container 18.

It has been determined that a connector constructed as described with reference to FIG. 2 has several shortcomings. The seal ring 62 is not a typical O-ring type seal but must be specially constructed to provide the annular rib 70. This is expensive. In practice, it has been found that it is hard to manufacture this seal to obtain the proper hardness specification. Leaks can occur due to the various refrigerants and oils which may change the hardness of the seal causing it to become softer and this may affect hydrostatic burst. Also, it has been found in practice that the assembly cannot properly hold a desired 29.6 Hg vacuum as is frequently required in the industry.

In addition to the foregoing, it has been found that there is a tendency for people to place a tool, such as a screwdriver, through the bore 84 in the cap 80 to engage and depress the depressor 32 against the resilient force of spring 30. This frequently causes scratching of the sealing surface 72 resulting in leakage of fluid. Also the placing of a screwdriver or tool into the bore 84 frequently causes damage to the rib 70 resulting in leakage of fluid.

SUMMARY OF THE INVENTION

It is an object of the invention to provide an improved connector for connecting a source of fluid with a container to be filled with fluid and wherein the connector employs a depressor which is not employed for providing a sealing surface as in the case of sealing surface 72 on depressor 32 in FIG. 2.

Still further, it is an object of the present invention to provide an improved connector of the type as described above and which eliminates the use of a special annular seal ring such as seal ring 62 in FIG. 2, and which employs a simple O-ring which may be made of softer material and which is relatively inexpensive.

In accordance with one aspect of the present invention, the improved connector assembly includes an elongated tubular body having a fluid passageway extending axially therethrough from an inlet to an outlet. A depressor is located in the passageway intermediate the inlet and the outlet and is mounted within the passageway for slidable movement therein between a normally valve closed first position blocking the flow of fluid from the inlet to the outlet and a valve open second position when the depressor is displaced from its first position toward the second position. A ball valve check assembly is located within the passageway between the inlet end and the depressor. This assembly includes a spool having a passageway extending axially therethrough. The spool passageway has a first passageway portion and a second passageway portion with the second passageway portion being located downstream from and of smaller diameter than the first passageway portion. A radially extending shoulder interconnects the first and second passageway portions. A resilient ball member having a greater diameter than the second passageway portion but less than that of the first passageway portion is located within the first passageway portion. A spring resiliently biases the ball member against the shoulder for preventing passage of fluid through the spool passageway. The depressor has an actuator extending therefrom toward the ball valve check assembly and into the second passageway portion for engaging the ball member and displacing the ball member against the resilient bias of the spring when the depressor is displaced toward its second position. This opens the ball valve assembly permitting fluid to flow from the inlet to the outlet.

BRIEF DESCRIPTION OF THE DRAWINGS

The foregoing and other objects and advantages of the present invention will become more readily apparent from the following description as taken in conjunction with the accompanying drawings, wherein.

DESCRIPTION OF PREFERRED EMBODIMENT

Figure 1:
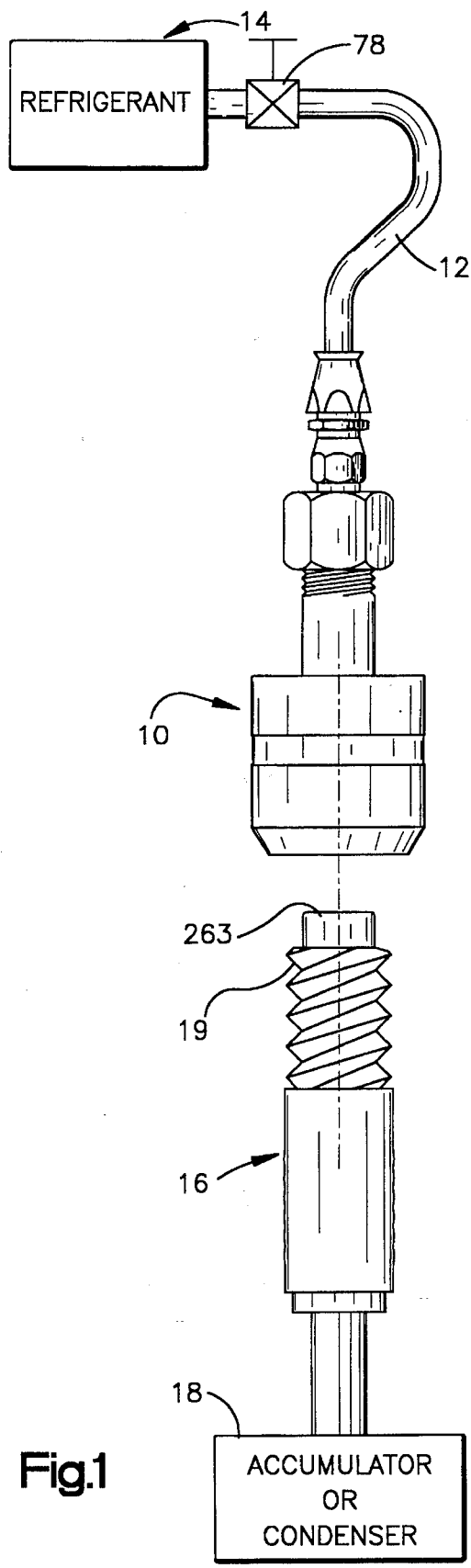
FIG. 1 is a plan view showing one application of the invention for interconnecting a source of refrigerant with a container to be filled.
Figure 2:
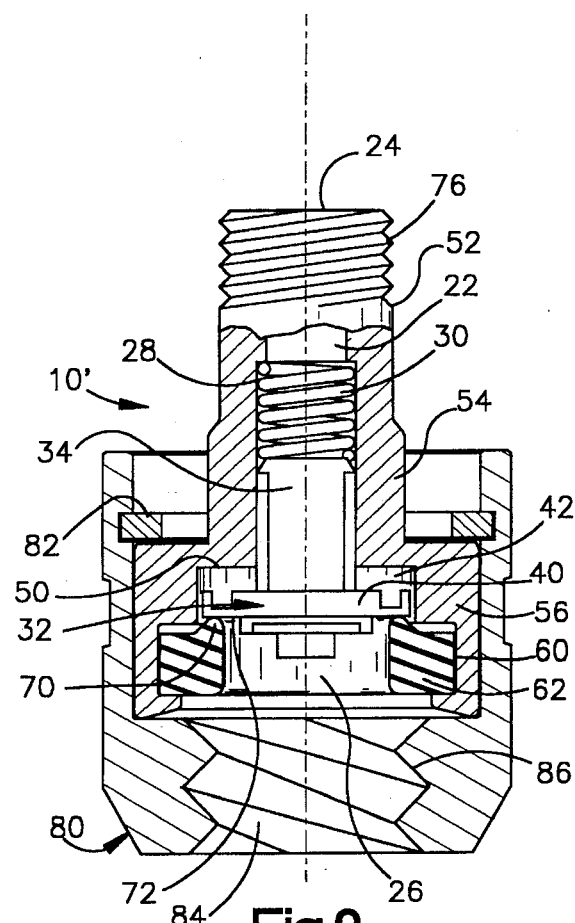
FIG. 2 is a plan view, partly in section, illustrating a connector constructed in accordance with the prior art.

Reference is now made to the drawings of FIGS. 1, 3, 4 and 5 wherein the showings are for the purposes of illustrating a preferred embodiment of the invention only and not for purposes of limiting same. Referring again to FIG. 1, there is illustrated an application of the present invention wherein a connector 10 is connected to one end of a reinforced hose 12 which is coupled to a source of refrigerant 14 by of a suitable shut-off valve 78. The connector 10 may be referred to as a female connector. The connector is used to connect the source 14 with a container 18, which may be accumulator or a condenser in a refrigeration system.

Figure 5:
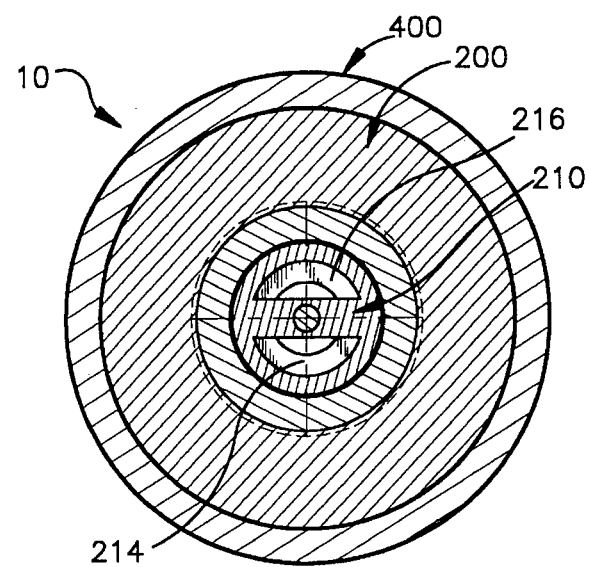
Figure 3:
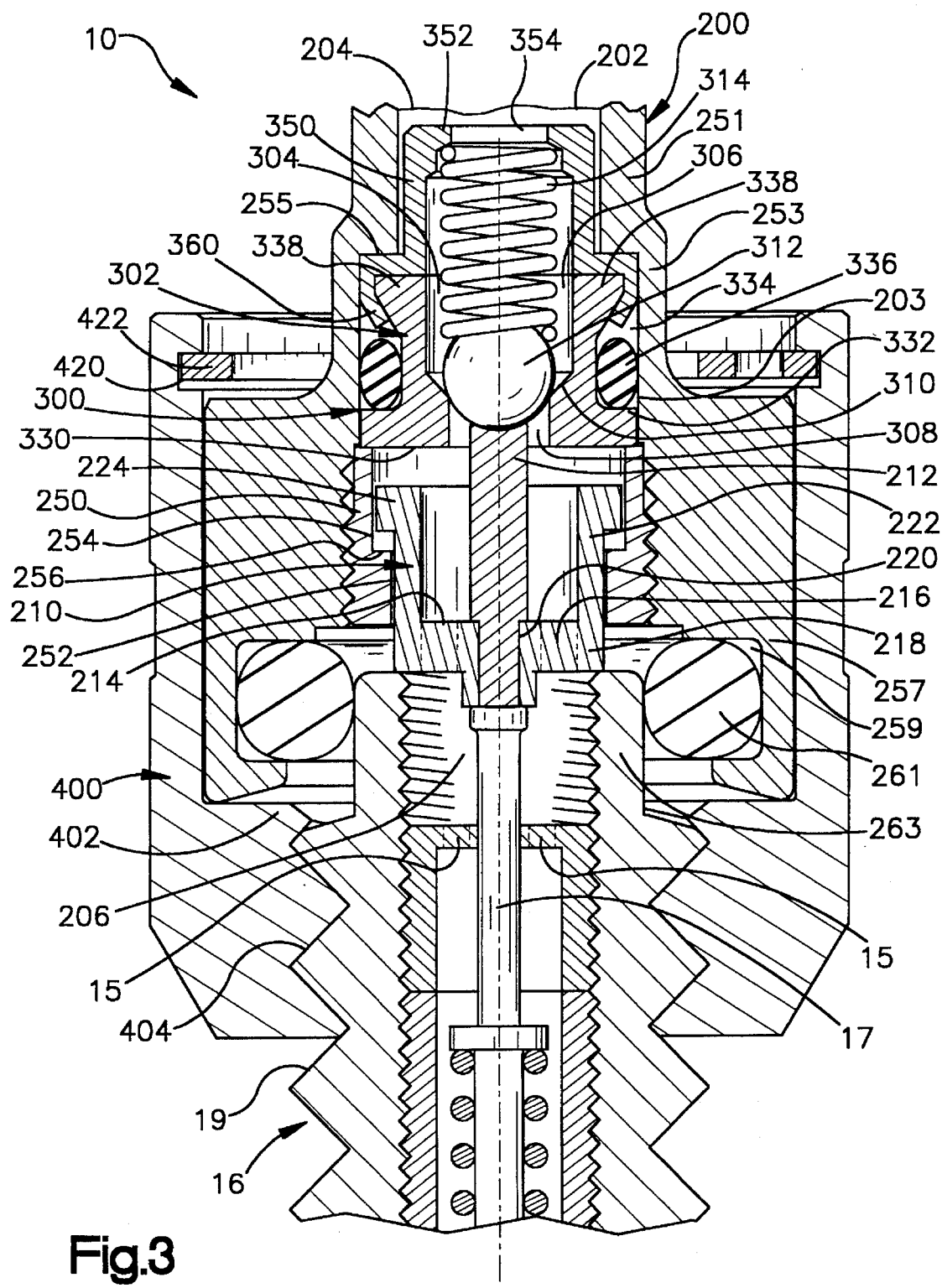
FIG. 3 is an enlarged sectional view illustrating a connector, constructed in accordance with the present invention in a valve closed position.
Figure 4:
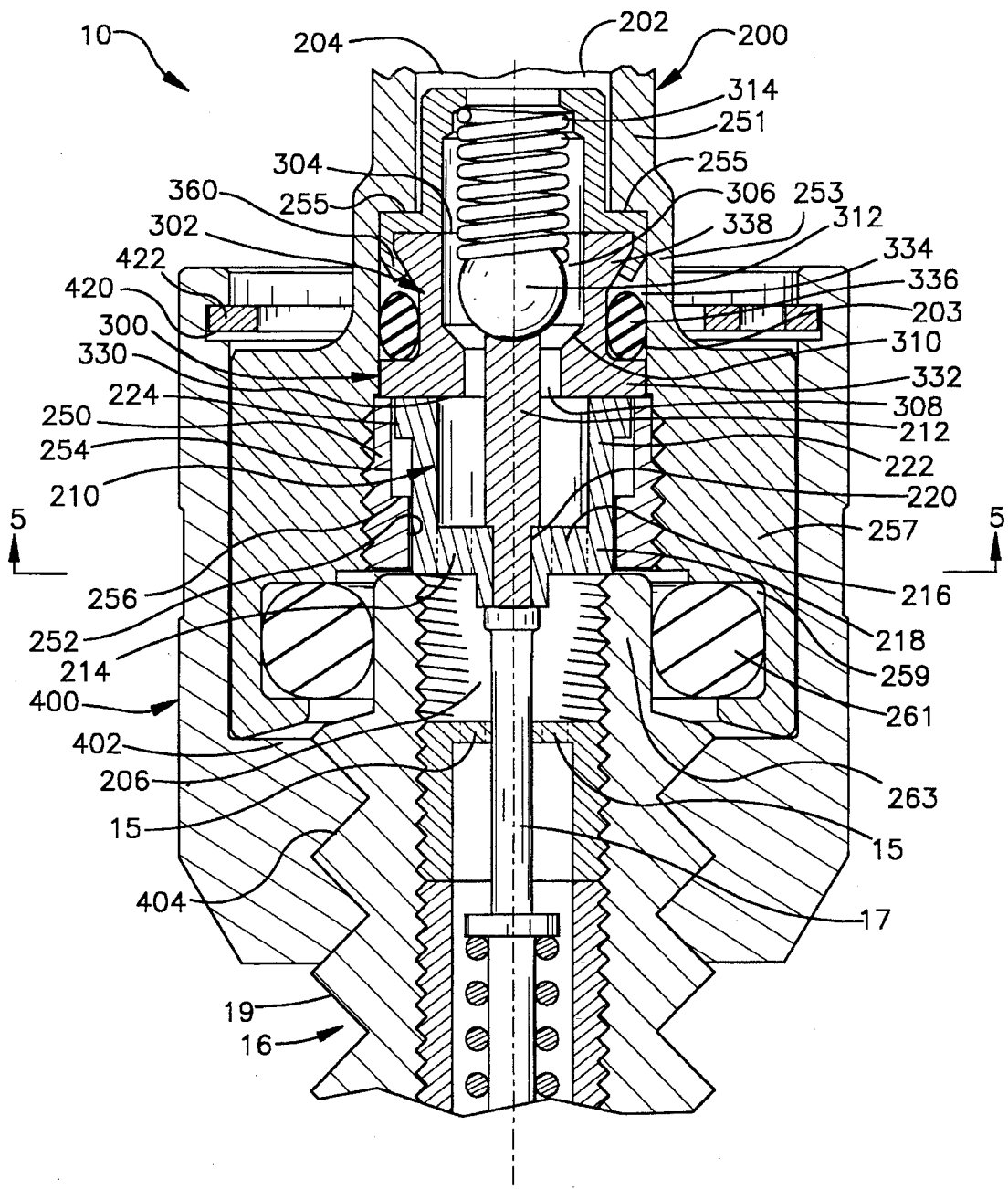
FIG. 4 is a view similar to that of FIG. 3 but showing the connector in a valve open position; and, FIG. 5 is a sectional view taken along line 5—5 looking in the direction of the arrows in FIG. 4.

The connector 10, as shown in FIGS. 3, 4, and 5, includes an elongated tubular body 200 constructed of metal, such as brass. Body 200 has a passageway 202 which extends axially through the body from an inlet 204 to an outlet 206. A depressor 210 constructed of metal, such as brass, is located in the passageway 202 intermediate the inlet 204 and the outlet 206 and is slidably mounted within the passageway for movement therethrough between a first position, as shown in FIG. 3, wherein fluid flow is blocked 10 from the inlet to the outlet and a second position, as shown in FIG. 4, which serves as a valve open position to permit fluid flow. As will be brought out in greater detail hereinafter, the depressor may be displaced from its first position, as shown in FIG. 3, to its second position, as shown in FIG. 4, when the connector 10 is mounted onto a suitable male fitting 16 extending from a container 18 to be filled with fluid, such as a refrigerant.

A ball valve check assembly 300 is located in the passageway 202 between the inlet 204 and the depressor 210. This ball valve assembly includes a spool 302 having a spool passageway 304 extending axially therethrough. The spool passageway 304 includes a first passageway portion 306 and a second passageway portion 308 with the second passageway portion being located downstream from the first portion and being of smaller diameter than the first portion. A canted radially extending shoulder 310 interconnects the first passageway portion 306 with the second passageway portion 308.

A resilient ball 312, which may be constructed of rubber, has a diameter greater than passageway portion 308 but less than passageway portion 306. This ball is located in passageway portion 306 and is resiliently biased against shoulder 310 by means of a coil spring 314 also located in the first passageway portion 306. In this manner the ball 312 normally prevents the flow of fluid through the spool passageway from the first portion 306 to the second portion 308 and, hence, prevents fluid entering inlet 204 from reaching outlet 206.

The depressor 210 has an actuator means taking the form of an actuator rod 212 which extends axially into the passageway portion 308 in the spool 302. This actuator rod normally extends sufficiently into the spool to engage ball 312.

As will be brought out hereinafter, it is contemplated that a male inlet fitting 16 includes a spring biased valve stem 17 which, in assembly, bears against depressor 210 and serves to displace the depressor in an axial direction from its normally valve closed first position as shown in FIG. 3 toward the valve open second position as shown in FIG. 5. This causes the depressor actuator rod 212 to displace ball 312 toward the inlet of body 202 against the resilient bias of spring 314 to open the valve assembly. This permits fluid from the refrigerant source 14 to flow from the inlet 204 of body 200 and, thence, through openings 214 and 216 in the roof 218 of the depressor 210. Thereafter, the fluid flows from the connector outlet 206 and into the male inlet fitting 16 by way of apertures 15 for filling the container 18, in a conventional manner.

The depressor 210 is somewhat cup shaped in that it is provided with a roof 218 having a central aperture 220 extending therethrough for receiving a portion of the length of the actuator rod 212. The actuator rod extends axially away from roof 218 toward spool 300 and is coaxially surrounded by a skirt 222 of the depressor. The upper end of the skirt flares outwardly to provide an annular shoulder 224.

An annular nut 250 coaxially surrounds skirt 222 of depressor 210. This annular nut 250 is provided with external threads which threadingly engage internal threads located within passageway 202 of the body 200. With the nut threaded in place, as shown in FIGS. 3 and 4, the depressor 210 is received for slidable movement and is guided in its movement by the internal surface of the annular nut 250. That is, the nut 250 includes a first cylindrical surface 252 of a diameter slightly greater than that of skirt 222 permitting axial movement of the skirt. The nut is provided with a second cylindrical surface 254 of slightly greater diameter than that of surface 252 and of greater diameter than the shoulder 224 of the depressor. With the nut in place, as shown in FIGS. 3 and 5, it holds the ball valve check assembly 300 in place in passageway 202 within the body 200. The spool 302 is provided with an radially extending surface 330 that serves as a stop to limit axial movement of depressor 210, in an upward direction (as viewed in FIG. 3), until the depressor contacts surface 330, as is shown in FIG. 4.

A radially extending flange 256 separates surfaces 252 and 254 in the annular nut 250. This flange also serves as a stop for shoulder 224 of depressor 210 to prevent the depressor from exiting from the body 200 when the nut 250 is in place.

The actuator rod 212 preferably takes the form of a stainless steel rod which has a reduced diameter at one end with the reduced diameter portion being received in aperture 220 in the roof 218 of depressor 210 by means of a press fit. The other end of the rod is provided with a curvature matching that of the ball 312. This is a spherical curvature providing a recess for receiving ball 312.

The spool 302 of the ball check valve assembly 300 is received within the passageway 202 within an enlarged passageway portion 203. The spool, at its end closest to the depressor 210, has a radially extending shoulder 332 of a diameter slightly less than that of the passageway portion 203 so that the spool may be positioned within the passageway. In order to maintain a fluid type connection, shoulder 332 cooperates with an annular groove 334 to receive a rubber O-ring 336 which resiliently engages the interior wall of body 200 to maintain a fluid type engagement. At the upper end of the spool, the exterior surface is flared outwardly to provide a flared shoulder 338.

A housing 350 coaxially surrounds spring 314 and is turned inwardly at its upper end to provide an inwardly directed annular flange 352 having an internal diameter smaller than that of the coiled spring 314 so as to hold the coiled spring in place. This annular flange 352 has a central aperture 354 through which fluid may enter from the inlet 204 into the interior of the housing.

The other end of housing 350 is flared outwardly and then turned inwardly to provide an annular end 360 which is crimped over and receives the flared shoulder 338 of spool 302 to maintain the spool in place with the ball 312 and spring 314 contained within the housing and the passageway portion 306 of the spool.

The body 200 has a first body portion 251 that coaxially surrounds a portion of the length of housing 350 of the ball check valve assembly 300. This is followed by a second body portion 253 of greater diameter than that of body portion 251 and which surrounds spool 302 and is separated from body portion 251 by a radially extending shoulder 255. Shoulder 255 serves as a stop to limit axial movement of housing 350 in the direction of inlet 202. Thus, the shoulder 255 prevents the annular end 360 of the housing 350 from moving toward the inlet, when in assembly.

Body portion 253 is followed by a third body portion 257 of greater external diameter than that of body portion 253 but of essentially the same internal diameter. Body portion 253 has internal threads for receiving the external threads of the nut 250.

The third body portion 257 is provided with an annular groove 259 which receives a resilient O-ring 261. This O-ring 261 permits entry of a cylindrical portion 263 of the male inlet fitting 16 in such a manner that the cylindrical portion 263 makes fluid tight engagement with the resilient O-ring to prevent escape of fluid. Consequently, when the ball 312 is in the valve open position, fluid from the inlet will flow from body 202 by way of openings 214 and 216 in the roof 218 of depressor 210 and, thence, through the outlet 206 and into the interior of the male fitting 16 to the container 18.

The connector 10 is also provided with a cap 400 which coaxially surrounds the third portion 257 of the body 200 and has an internal diameter sufficiently greater than that of the external diameter of body portion 257 to provide a loose fit permitting the cap to rotate or swivel about the body 200. At the fluid outlet 206, the cap 400 extends inwardly to provide an inwardly turned annular flange 402 having internal threading 404 so that the cap may be threaded onto external threading 19 on the male inlet fitting 16 so as to hold the connector firmly in place on the inlet fitting. At the inlet, the cap 400 is provided with an annular groove 420 which receives a snap ring 422. The snap ring 422, when installed in groove 420, serves to limit axial movement of cap 400 relative to body portion 255 of body 200. This prevents the cap 400 from becoming dislodged from the body 200 when the cap 400 is not threaded onto a male fitting such as fitting 16.

With the exception of the O-rings 259 and 356 and the rubber ball 312, the various parts herein are preferably constructed of metal. As previously discussed, the rod 212, spring 314 and the spring snap ring 422 are preferably constructed of stainless steel. The remaining metal parts are preferably constructed of brass.

In assembly, as shown in FIG. 3, the cap 400 is threaded onto the male inlet fitting 16 extending from the container 18. The valve is closed since ball 312 is resiliently biased against the canted radially extending shoulder 310 by means of the spring 314. This prevents fluid movement from the inlet 202 to the outlet 206.

As the cap 400 is further tightened onto the inlet fitting 16 toward the location as shown in FIG. 4, the ball 312 is displaced by actuator rod 212 toward the inlet 202 against the bias of spring 314. This displaces the ball 322 from the shoulder 310 allowing fluid from inlet 204 to pass through passageway 202 including the first passageway portion 306 and beyond ball 312 into the second passageway portion 308 and into the interior of the depressor 210. From there, fluid flows through openings 214 and 216 in the roof 218 of the depressor to the outlet 206 and into the male fitting 16 and from there, in a conventional manner, into the container 18.

Although the invention has been described in conjunction with the preferred embodiment, it is to be appreciated that various modifications may be made without departing from, the spirit and scope of the invention as defined by the invented claims.

Having described the invention, the following is claimed:

1. A connector assembly for connecting a source of fluid with a container to be filled with fluid and comprising:

an elongated tubular body having a fluid passageway extending axially therethrough from an inlet to an outlet so that fluid may enter said inlet and exit from said outlet;

a depressor located in said passageway intermediate said inlet and said outlet and mounted within said passageway for slidable movement therein between a normally valve closed first position blocking the flow of fluid from said inlet to said outlet and a valve open second position when said depressor is displaced from its said first position toward said second position;

a ball valve check assembly located within said body passageway between said inlet and said depressor, said assembly including a spool having a spool passageway extending axially therethrough, said spool passageway having a first passageway portion and a second passageway portion with said second passageway portion being located downstream from said first passageway portion and being of a smaller diameter than said first passageway portion, a radially extending shoulder interconnecting said first passageway portion and said second passageway portion, a resilient ball member having a diameter greater than said second passageway portion but less than said first passageway portion located within said first passageway portion, and spring means for normally resiliently biasing said ball member against said shoulder for preventing passage of fluid through said spool passageway from said first passageway portion to said second passageway portion;

said depressor having an actuator means extending therefrom toward said ball valve check assembly and extending into said second passageway portion for engaging said ball member and displacing said ball member against the resilient bias of said spring means when said depressor is displaced toward its second position to thereby open said ball valve assembly permitting fluid to flow from said inlet to said outlet; and, wherein said depressor is cup shaped having a roof portion and an annular skirt portion extending in an axial direction from said roof portion and coaxially surrounding at least a portion of the length of said depressor actuator means.

2. A connector assembly as set forth in claim 1 wherein said depressor actuator means is an elongated rod having a free end facing and engaging said ball member.

3. A connector assembly as set forth in claim 2 wherein the free end of said rod is provided with a recess having a contour suitable for receiving a portion of said ball member therein.

4. A connector assembly as set forth in claim 3 wherein said recess is spherically shaped corresponding in curvature with that of said ball member.

5. A connector assembly as set forth in claim 1 wherein said depressor actuator means is an elongated rod having a first end connected to said roof portion and an opposite second end extending toward said ball member.

6. A connector assembly as set forth in claim 5 wherein the second end of said rod extends beyond said skirt portion of said depressor in the direction of said inlet.

7. A connector assembly as set forth in claim 1 wherein said depressor has a fluid opening defined therein so that fluid may flow through said depressor opening toward said outlet.

8. A connector assembly as set forth in claim 7 wherein said fluid opening is in said depressor roof portion.

9. Apparatus as set forth in claim 1 including an annular nut coaxially surrounding said depressor skirt and having an internal diameter slightly greater than the outer diameter of said depressor skirt so as to permit axial slidable movement of said depressor.

10. A connector assembly for connecting a source of fluid with a container to be filled with fluid and comprising:

an elongated tubular body having a fluid passageway extending axially therethrough from an inlet to an outlet so that fluid may enter said inlet and exit from said outlet;

a depressor located in said passageway intermediate said inlet and said outlet and mounted within said passageway for slidable movement therein between a normally valve closed first position blocking the flow of fluid from said inlet to said outlet and a valve open second position when said depressor is displaced from its said first position toward said second positions;

a ball valve check assembly located within said body passageway between said inlet and said depressor, said assembly including a spool having a spool passageway extending axially therethrough, said spool passageway having a first passageway portion and a second passageway portion with said second passageway portion being located downstream from said first passageway portion and being of a smaller diameter than said first passageway portion, a radially extending shoulder interconnecting said first passageway portion and said second passageway portion, a resilient ball member having a diameter greater than said second passageway portion but less than said first passageway portion located within said first passageway portion, and spring means for normally resilienting biasing said ball member against said shoulder for preventing passage of fluid through said spool passageway from said first passageway portion to said second passageway portion;

said depressor having an actuator means extending therefrom toward said ball valve check assembly and extending into said second passageway portion for engaging said ball member and displacing said ball member against the resilient bias of said spring means when said depressor is displaced toward its second position to thereby open said ball valve assembly permitting fluid to flow from said inlet to said outlet; and, wherein said spool has a radially inwardly extending annular groove in its outer surface, a resilient O-ring carried in said annular groove for resiliently engaging the surrounding walls of said body passageway for maintaining a fluid tight seal therebetween.

11. A connector assembly as set forth in claim 10 including a tubular housing mounted to said spool adjacent to said first passageway portion in said spool, said housing containing said spring means and having an open inlet end adjacent to the inlet of said body and an open outlet end coupled to said spool permitting fluid to flow through said housing from said inlet end to said outlet end and then into said first passageway portion of said spool.

12. A connector assembly as set forth in claim 11 wherein said depressor actuator means is an elongated rod having a free end facing and engaging said ball member.

13. A connector assembly as set forth in claim 12 wherein said free end of said rod is provided with a recess having a contour suitable for receiving a portion of said ball member therein.

14. A connector assembly as set forth in claim 13 wherein said recess is spherically shaped corresponding in curvature with that of said ball member.

15. A connector assembly as set forth in claim 10 wherein said depressor is cup shaped having a roof portion and an annular skirt portion extending in an axial direction from said roof portion and coaxially surrounding at least a portion of the length of said depressor actuator means.

16. A connector assembly as set forth in claim 15 wherein said depressor actuator means is an elongated rod having a first end connected to said roof portion and an opposite second end extending toward said ball member.

17. A connector assembly as set forth in claim 16 wherein the second end of said rod extends beyond said skirt portion of said depressor in the direction of said inlet.

18. A connector assembly as set forth in claim 15 wherein said depressor has a fluid opening defined therein so that fluid may flow through said depressor opening toward said outlet.

19. A connector assembly as set forth in claim 18 wherein said fluid opening is in said depressor roof portion.

\* \* \* \* \*